Figure 2:
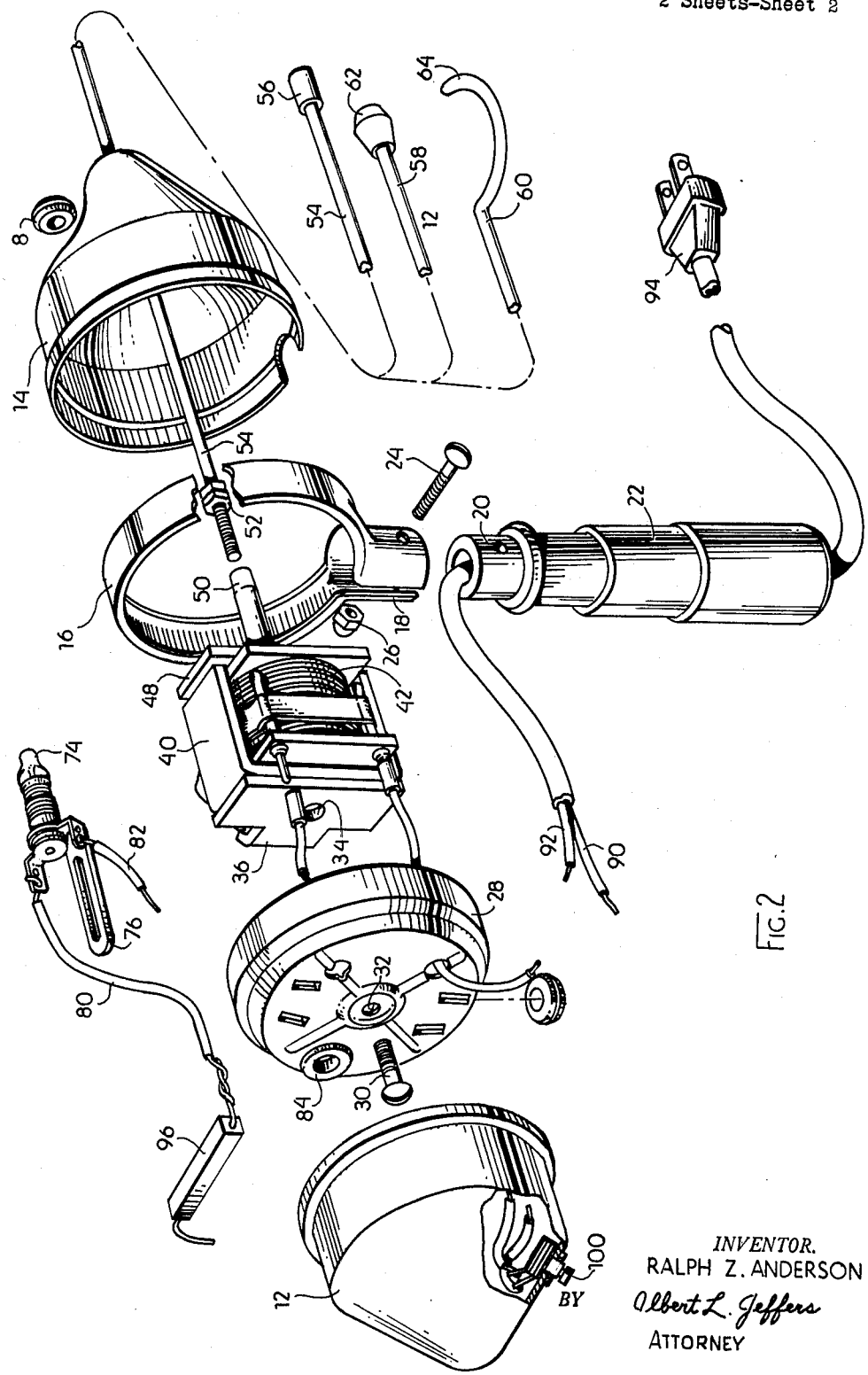

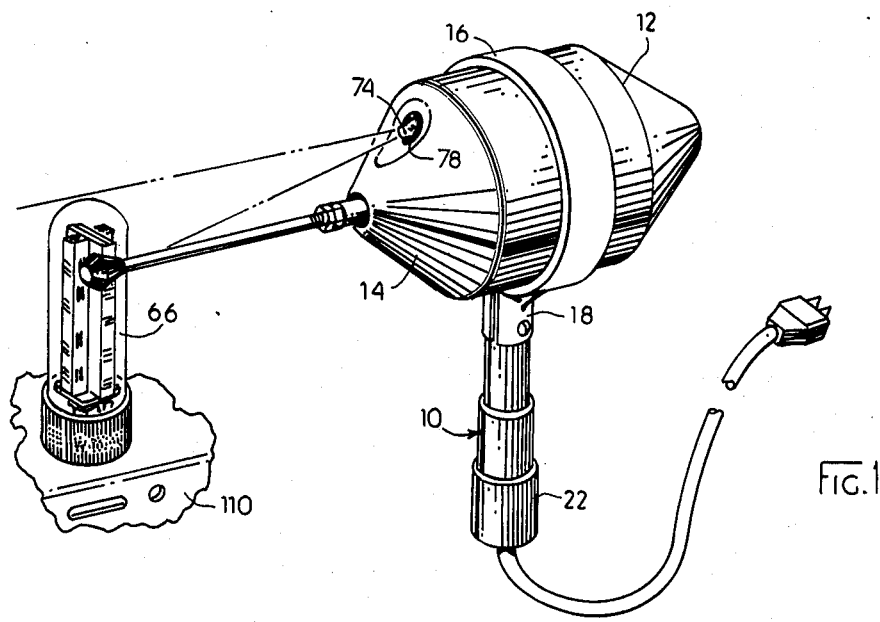
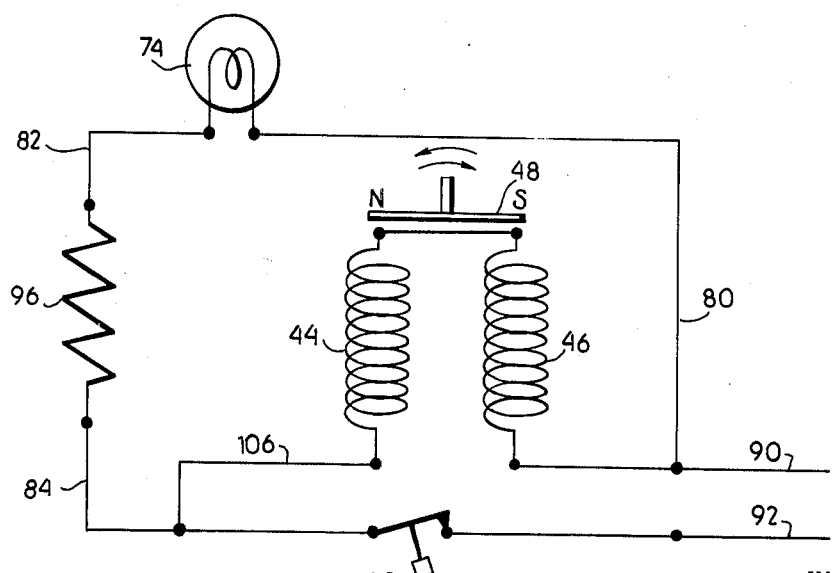

United States Patent Office 3,235,755
Patented Feb. 15, 1966

3,235,755
ELECTROMAGNETIC VIBRATOR
Ralph Z. Anderson, 1915 Wells St., Fort Wayne, Ind.
Filed Dec. 31, 1962, Ser. No. 248,481
4 Claims. (Cl. 310—36)

This invention relates to a testing apparatus, and more particularly to a testing apparatus for electronic equipment such as printed circuits, vacuum tubes and the like, whereby electronic components therein can be tested apart from their associated structure while in circuit and in operation.

When complex electronic equipment is malfunctioning, it is difficult to narrow the malfunctioning to the specific part of the circuit which is producing the trouble. Since there are numerous potential sources of malfunctioning, as for example a loose connection, a malfunctioning printed circuit, or a malfunctioning electronic tube, it is important to use whatever diagnostic equipment is available to narrow the source of trouble down to a specific portion of the system in order to reduce the length of time which would otherwise be involved in merely random-type searching of the circuit as a whole.

It is one of the objects of the present invention to provide a valuable tool for quickly checking key parts of an electronic circuit in order to pin point the source of trouble and thereby shorten the time within which an accurate servicing can take place.

One of the primary objects of the present invention is therefore to produce a test apparatus which quickly and reliably pin points the source of malfunctioning within an electronic circuit, relating such source of trouble to a component of the circuit.

A further object of the invention is to provide a test apparatus in the form of a vibrator having a plurality of fixtures adapted to trace the source of malfunctioning within an electronic circuit to different sources such as printed circuits, electron tubes and the like.

A still further object of the invention is to provide a test apparatus which is adapted to reach into relatively inaccessible parts of a complex electronic circuit and quickly and reliably pin point the source of malfunctioning; this action to take place while the parts are actually operating within the circuit in order to isolate the location of malfunctioning without disturbing the adjoining components.

A still further object of the invention is to provide a novel vibrator which will detect variously different kinds of malfunctioning such as loose connections, bad components, defective circuits and the like, all of which can occur within a circuit and which are difficult to localize as the sources of trouble.

A still further object of the present invention is to provide a novel vibrator having a tool which is caused to oscillate sideways at a predetermined frequency which is nondestructive to the component which it tests but at the same time imparts an exercising vibration which will readily determine whether or not the part is operating properly. In short, the present invention is valuable for detecting any form of disrepair which can be made obvious by vibrating the part at a nondestructive amplitude and frequency.

An important feature of the present invention is that when a component such as a tube has a defective filament, it is possible to vibrate the tube with the apparatus of the present invention and to repair the tube by simultaneously energizing and vibrating it so that the filament will fuse itself back into place.

Other objects and features of the invention will become apparent from a consideration of the following description which proceeds with reference to the accompanying drawings, wherein:

FIGURE 1 is an isometric view of the test apparatus as it is used in testing an electron tube;
FIGURE 2 is an exploded isometric view of the apparatus shown in FIGURE 1; and
FIGURE 3 is a wiring diagram of the apparatus shown in FIGURES 1 and 2.

Referring now to the drawings, the apparatus designated generally by reference numeral 10 includes a rear housing 12 and front housing 14 which are clamped together by a ring 16 having a shank 18 fitted over the neck 20 of a handle 22 and clamped thereto by a bolt 24 which receives a threaded nut 26.

Within the interior of the housing is a mounting disc 28 which fits within the rear housing 12 and receives a mounting bolt 30 which passes through opening 32 and into opening 34 of frame 36 to support the frame 36. Frame 36 is U-shaped and nested therein is a complementary U-shaped magnetic plate 40 which mounts a coil 42 having two coaxial windings 44 and 46 (FIG. 3). The frame 36 is connected to armature 48 which in turn is connected to an adapter 50 having a lock nut coupling 52 with an extension rod 54. The rod 54 has a threaded adapter 56 which can be coupled with any one of the fixtures 58, 60 or the like. Fixture 58, for example, has a rubber tip head 62 and fixture 60 has a hook 64 which can be provided in varying sizes depending upon the size of the tube 66 (FIG. 1) undergoing tests.

The extension rod 54 can be made quite long so that the rubber tip head 62 or hook 64 can be extended within relatively inaccessible parts; and since illumination is needed for proper visual inspection as to where testing is taking place, there is provided a light 74 which is received on a mounting bracket 76 and extends through an opening 78 to direct a beam of light into the work location. The conductors 80, 82 for the light 74 are passed through grommets 84 of disc 28 and are suitably connected to lead-in conductors 90, 92 which in turn connect with a plug 94 after passing through the handle 22.

Referring to FIG. 3, a suitable resistance 96 can be included within the circuit in order to protect the light 74.

In operation, the manual switch 100 is closed making a circuit from conductor 90, coil 46, coil 44, conductor 106, switch 100 and conductor 92 (FIG. 3). Simultaneously, the light 74 is illuminated by making a circuit through conductor 90, conductor 80, light 74, conductor 82, conductor 84, switch 100 and conductor 92. This way, the operator has adequate visibility to probe the apparatus at a given location.

The coil 42 is a double distributor wound coil so that the attractive force of the coil will be intermitted according to the frequency of the A.C. power supply. When the coil 42 is energized it will move the armature in two directions only providing an oscillating movement of the tool at its outer end of approximately one eighth of an inch.

In this way, a crosswise vibratory effect is set up on the armature 48 and the armature 48, being secured to the adapter 50, will produce a similar vibratory or oscillatory effect on the rod 54 and the associated tool, i.e. the rubber head 62 or hook 64 depending upon whether rod 58 or 60 is coupled with the extension rod 54.

The vibratory effect communicated to the rubber tip head 62 (referring to FIG. 1) will gently tap against the tube 66. Since the circuit is being energized, it will be readily apparent if the source of trouble lies in the tube 66 since the characteristics of the circuit will be substantially altered by the vibratory effect if the trouble is located within the vibrated tube 66. All of this takes place while the tube is mounted in operative position on its support or housing 110. The testing apparatus is also usable by encircling the tube 66 with a semi-circular hook 64 in which case the arcuate inner surface of the hook 64 is impinged against the cylindrical surface of the tube 66. Thus, if the trouble is traced either internally of the tube or to a faulty connection of the tube, the overall aspect of the circuit will be exaggerated when the component is vibrated.

Similarly, a printed circuit will manifest itself as a source of malfunctioning when it is tapped by the rubber tip head 62, i.e., vibrated by bringing the oscillating rubber tip head 62 against such a circuit while the apparatus is functioning.

It should be appreciated that the apparatus functions to impart a rapid sidewise movement to the tool whether it be a head 62, hook 64 or the like, and that the tool while undergoing a very rapid vibration is nevertheless essentially gentle in its action in order not to produce a destructive effect on any of the electronic components.

The entire working of the apparatus to be tested can be probed and the source of trouble detected by noting any gross effects on the operation of the system when any particular portion thereof is vibrated. In this manner, the operator can quickly pin point the source of trouble.

Since a typical electronic circuit includes many relatively inaccessible parts which are very poorly illuminated, it is possible by means of the light 74 to direct the probing effort and the length of the rod 58, or 60 permits the working end thereof to communicate with substantially all parts of the system no matter how inaccessible.

By means of the present invention, it is possible to save a substantial amount of time in tracing down the source of trouble within a complicated circuit rather than by mere trial and error substitution of components. Also, it is possible to isolate more particularly the source of trouble since each component is for all practical purposes individualized in the testing procedure so that its operativeness is determined independently of the associated electronic structure.

The present invention can, of course, be used for testing apparatus other than electronic structure, and indeed, it is anticipated that use can be found of the present invention for any system wherein the component will evidence malfunctioning by vibration. The present invention is especially useful, however, where the degree of vibration is especially suited for delicate instrumentalities which must be vibrated sufficiently to evidence trouble but not to become damaged thereby.

The present invention is also useful in the repair of electronic devices such as tubes in which the component is vibrated while it is energized and in this way the filament will become fused and thereby fit for reuse. It has been found that the present invention will invariably effect a proper repair when used in this manner.

Although the present invention has been illustrated and described in connection with a single example embodiment, it will be appreciated that the embodiment is illustrative of the invention and is in no sense restrictive thereof. It is reasonably to be expected that those skilled in the art can make numerous revisions and adaptations of this invention without departing from the underlying principles thereof and these are intended to be included within the scope of the following claims as equivalents of the invention.

I claim:
1. Electronic equipment testing apparatus comprising:
 (a) a housing having a handle adapted for manipulation of the housing and for directing the testing operation;
 (b) a coil including two windings which are energized by alternating current and effect opposite polarities to provide complementary attractive force during the cycle of said alternating current; a frame having a U-shaped magnetic plate for receiving said coil;
 (c) an armature forming a part of the frame and located adjacently to said coil to be attracted thereby when said windings are energized and are of complementary polarity, which comprises a vibrator operatively secured to said armature for operation thereby; and
 (d) a tool means connected to said armature for transmitting the vibrations to an apparatus to be tested.

2. A testing apparatus comprising:
 (a) a housing providing a mounting structure;
 (b) a coil including winding which is energized to effect magnetic attractive force;
 (c) an armature including a frame portion operatively carried by said housing and a movable portion located in relation to said coil to be alternatively actuated to and from said coil; a U-shaped magnetic plate carried by said frame portion and adapted to support said coil and,
 (d) means forming a tool operatively secured to the movable portion of said armature for vibratory movement thereby.

3. A vibrator tool for testing electronic equipment, comprising:
 (a) a housing;
 (b) a coil including winding;
 (c) frame means forming an armature having a movable portion disposed to receive an attractive force from said coil to be operated thereby; and
 (d) tool means including an elongated rod having a rubber tipped head at one end operatively secured to the movable portion of said armature to be activated and effect vibration of the electronic equipment portion undergoing test.

4. A vibrator for testing electronic equipment, comprising:
 (a) a housing;
 (b) coil means for receiving an alternating current and including a normally closed switch for communcating such alternating current to said coil means;
 (c) armature means including a mounting portion and a resilient movable portion disposed for movement by attractive force from said coil means and having a switch-operating means for effecting opening and closing of the power supply, a U-shaped magnetic plate carried by said mounting portion and adapted to support said coil within the confines of said U-shaped plate, and
 (d) tool means including an elongated rod having a hook portion at one end operatively carried by the vibrating portion of said armature so that it will oscillate the tool approximately one-eighth of an inch at the outer end of the tool.

References Cited by the Examiner
UNITED STATES PATENTS
2,310,166  2/1943  Way _____ 310—73
FOREIGN PATENTS
650,052  2/1951  Great Britain.

ORIS L. RADER, Primary Examiner.
MILTON O. HIRSHFIELD, Examiner.